W. J. Linton,
Try Square & Calipers,
No. 95,495. Patented Oct. 5. 1869.
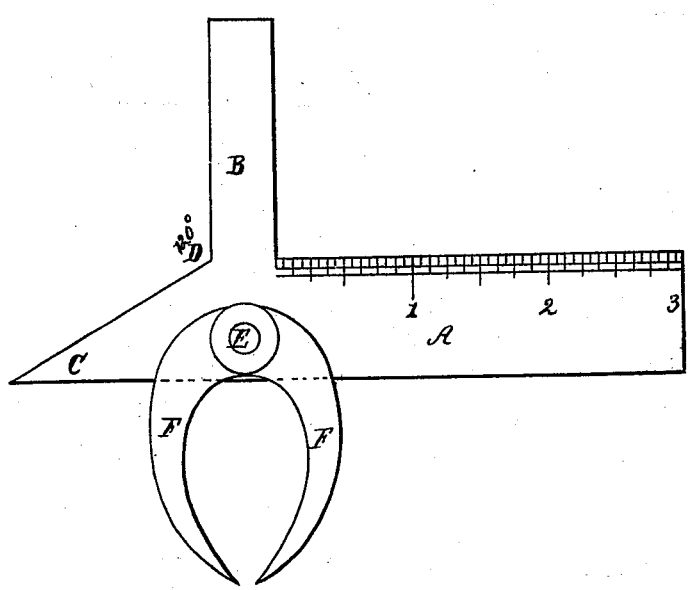
Witnesses
Charles A. W. Rice
H. F. Eberts
Inventor
W. J. Linton
Per Attorney
Thos. S. Sprague

United States Patent Office.

WILLIAM J. LINTON, OF DETROIT, MICHIGAN.

Letters Patent No. 95,495, dated October 5, 1869; antedated September 20, 1869.

IMPROVEMENT IN COMBINED TRY-SQUARE, CALIPER, &c.

The Schedule referred to in these Letters Patent and making part of the same.

*To whom it may concern:*

Be it known that I, WILLIAM J. LINTON, of Detroit, in the county of Wayne, and State of Michigan, have invented a new and useful Improvement in Combined Try-Square, Straight Edge, Six-Side, and Caliper; and I do declare that the following is a true and accurate description thereof, reference being had to the accompanying drawings, and to the letters of reference marked thereon, and being a part of this specification.

The object of this invention is to combine several convenient and important tools required by machinists, into one.

In order to accomplish this end, I make a square, with the long arm A at right angles with the short arm B, prolonging the long arm as at C, and cutting it at a proper angle, D, with the short arm B, to get the accurate angle of a six-sided bolt-head or nut, or other similar work.

Pivoted at E are the arms F of the caliper, while the arms A and B may be graduated into inches and fractions, if desired.

By the use of a tool constructed in this way, it will be found extremely useful in fitting either square or six-sided bolts, nuts, and in fitting keys.

What I claim as my invention, and desire to secure by Letters Patent, is—

The combination of a try-square, rule, caliper, and instrument for determining the angles of six-sided work, into one tool, constructed as herein substantially shown and described.

W. J. LINTON.

Witnesses:
 H. F. EBERTS,
 CHARLES A. W. RICE.